Sept. 25, 1928.  1,685,158

S. B. GOLD

COUPLING

Filed Nov. 21, 1927   2 Sheets-Sheet 1

INVENTOR
Samuel B. Gold
BY
Arthur P. Brun
ATTORNEY

Sept. 25, 1928.
S. B. GOLD
1,685,158
COUPLING
Filed Nov. 21, 1927   2 Sheets-Sheet 2
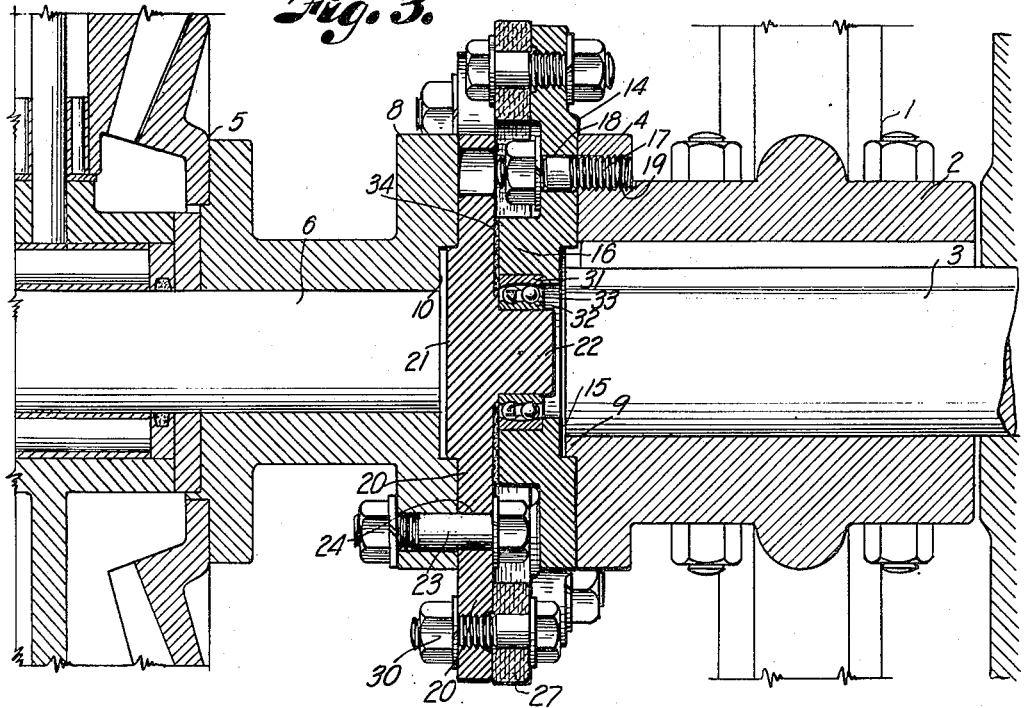
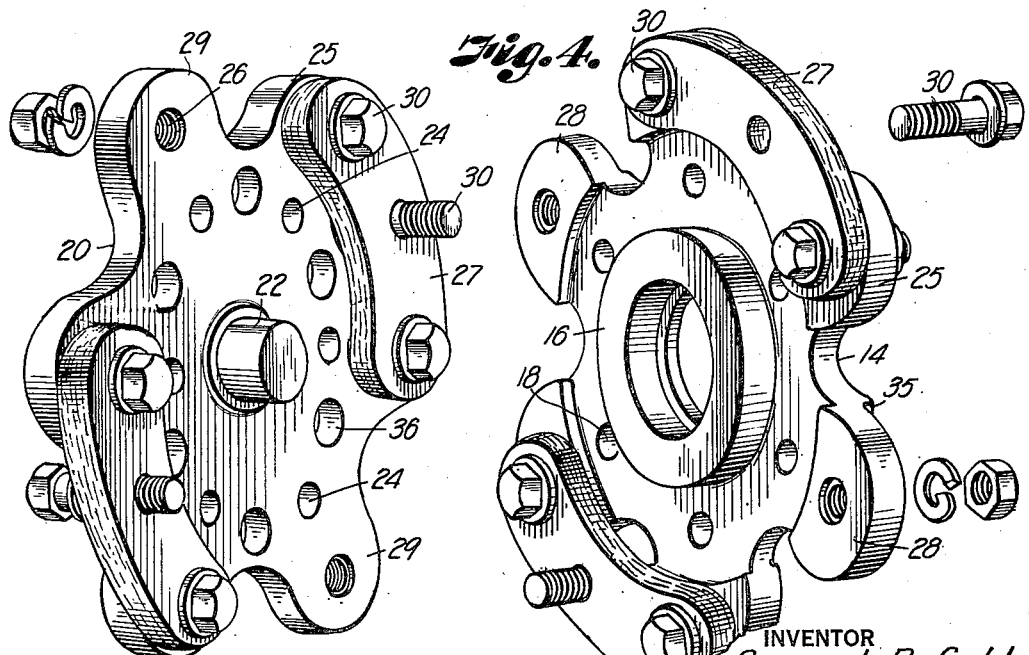
INVENTOR
Samuel B. Gold
BY
ATTORNEY Patented Sept. 25, 1928.

1,685,158

UNITED STATES PATENT OFFICE.

SAMUEL B. GOLD, OF KANSAS CITY, MISSOURI, ASSIGNOR TO WEBER ENGINE COMPANY, OF KANSAS CITY, MISSOURI, A CORPORATION OF IOWA.

COUPLING.

Application filed November 21, 1927. Serial No. 234,696.

My invention relates to flexible couplings and more particularly to a device of that character for directly connecting a prime mover with a driven member, such as a reversible clutch pulley; the principal object of the invention being to provide a coupling of this type whereby the free ends of the shaft members are inter-supported by the coupling independently of the power-transmitting element of the coupling, thereby obviating the necessity of an additional support, economizing space by the elimination of such additional element and shortening the distance between the driving and driven members; whereby the shaft members may be operatively connected irrespective of slight irregularity in angular alignment and such relation maintained by automatic adjustment of the coupling to later variations due to settling of foundations or other causes; and whereby variation in angularity of the shaft members is absorbed in the coupling, thereby maintaining a constant point of intersection of the axes of the respective members.

In accomplishing these and other objects of the invention I have provided improved details of structure, the preferred forms of which are illustrated in the accompanying drawings, wherein:

Fig. 3 is a longitudinal, sectional view through the coupling and the adjacent portions of the reverse pulley and engine on the line 3—3, Fig. 2.

Fig. 4 is a detail perspective view of the flexible coupling members in spaced relation.

Figure 1:
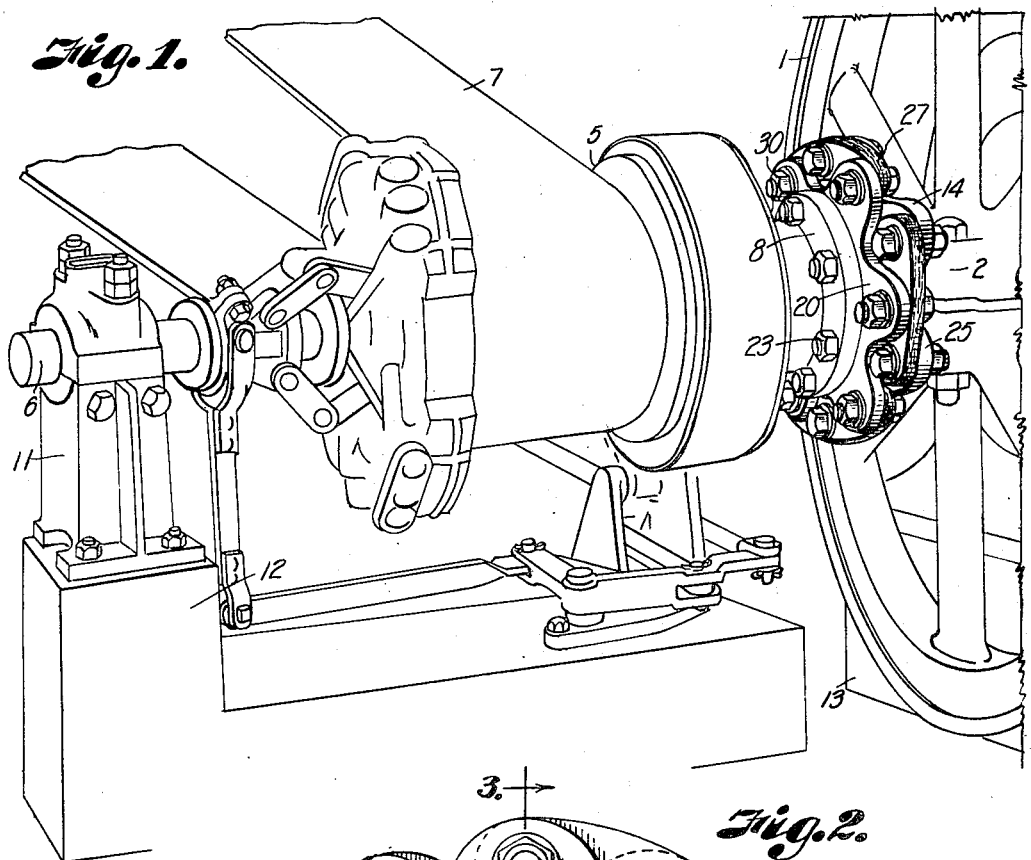
Fig. 1 is a perspective view of the preferred embodiment of my invention illustrated as connecting a reverse clutch element with an internal combustion engine.
Figure 2:
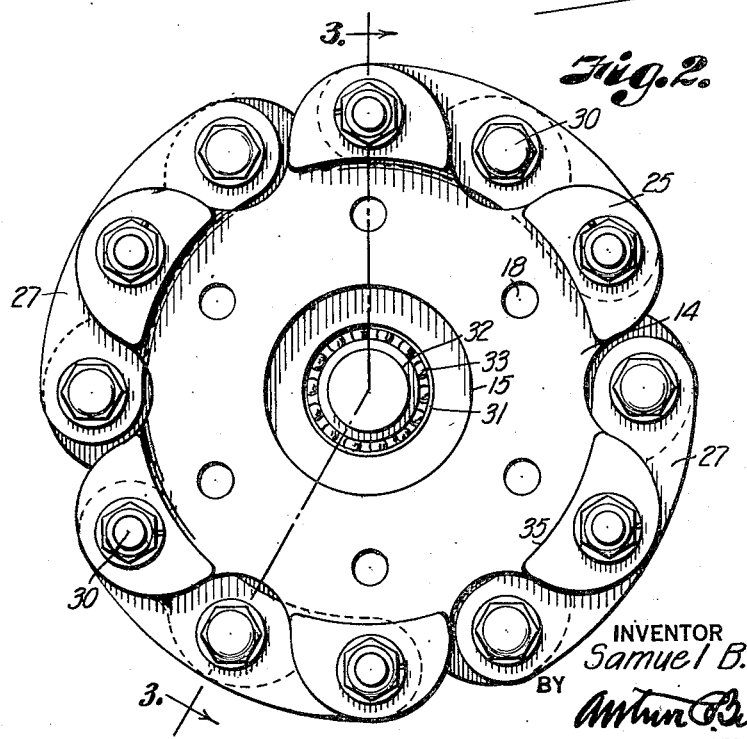
Fig. 2 is an elevational view of the coupling viewed from the engine side.

Referring in detail to the drawings wherein the coupling is illustrated in connection with an engine and a reversible clutch pulley, to which use it is particularly adapted:

1 designates the fly wheel of an engine of a type commonly employed for driving the band wheel of an oil well rig, having a hub 2 keyed to a crank shaft 3 and provided with an annular flange 4. 5 designates a reversible clutch pulley keyed on the pulley shaft 6 to operate a belt 7 and having a flange 8 complementary to the flange 4 of the fly wheel.

The flange 4 of the fly wheel is provided with an annular shoulder 9 which, according to common practice, is adapted to seat in an annular recess 10 of the pulley flange 8, whereby the fly wheel and pulley element are engaged, the flanges being secured together by stud bolts to drive and support the engine end of the pulley shaft 6. The opposite end of the shaft 6 is shown as supported by a bearing 11 from a concrete base 12 independent of the engine base 13.

With such an installation, it may happen that the pulley bearing may not have been mounted upon its foundation in true alignment with the engine, or the relationship of the engine and the bearing may have shifted due to settling of bases, wear of bearings, vibration, or other factors, resulting in an angular relationship between the pulley shaft and engine crank shaft, so that heavy loads operated by the pulley will cause excessive friction, unduly wearing the shaft and engine bearings and possibly causing breakage of the pulley shaft and serious interference with the drilling or pumping operations.

Heretofore, flexible couplings have been used to compensate angular relationship of shafts, but such flexible couplings have not been capable of nor adapted for supporting the free end of a driven shaft in positive rotational relation with the driver; in consequence whereof, independent supporting means have been provided, or supporting means which should be provided for safety and efficiency have been lacking.

I, therefore, provide a coupling including means for transmitting rotation from one shaft member to the other, in combination with shaft supporting means whereby the transmission means is relieved of load-supporting duty.

The coupling element comprises a driving member 14 consisting of a disk having a central recess 15 corresponding to the recess 10 of the pulley flange 8 which ordinarily receives the shoulder of the fly wheel hub, and a cylindrical, concentric hub 16 projecting from its inner face; the driving member being bolted to the hub of the fly wheel flange by studs 17 which project through openings 18 in the disk into the threaded sockets 19 in the fly wheel flange. A driven member 20, consists of a disk-like body similar to the driving member 14, having a concentric boss 21 on its outer side receivable in the recess 10 and a projecting stud 22 on its inner side adapted for reception in the hub of the driving member in concentric, spaced relation thereto; the hub 16 and stud 22 comprising supporting elements for ball bearing races, presently described, and the driven member being secured to the pulley flange by bolts 23 extending through openings 24 of said driven member 20.

Each of the disk members 14 and 20 is provided with spaced radial ears 25 and attached to pairs of adjacent ears, separated by intervening ears, are links 27, preferably arcuate and of resilient and flexible material having considerable tensile strength, such as leather; the ears 25 serving as intervening ears being designated 28 on the driving member and 29 on the driven member. The members 14 and 20 are joined face to face, the stud 22 on the member 20 extending into the hub 16 on the member 14 to support the pulley element from the fly wheel, and the links on each of the members being staggered in relation to the links on the other member, whereby the free ears of one member are positioned substantially centrally of adjacent links on the complementary member, bolts 30 connecting the free ears of each member with the central portions of the related links of the other member to lock the members together for transmission of rotation from the driving to the driven member.

The hub 16 of the driving member and the stud 22 of the driven member carry facing ball races 31 and 32 for bearing balls 33, the races being concaved longitudinally to permit adjustment of the members to varying angularity of the shaft sections and retain the point of intersection of the axes of the sections constant. Resilient packing 34, such as felt or the like, is interposed between the members.

The radial ears of the driving member are preferably outset on the driven member side of the driving member, as indicated by 35, to provide desired spacing of the members for accommodating the nuts of the bolts securing the members to the respective flanges and to provide spacing for the hub 16 from the driven member.

Openings 36, larger than the bolt-receiving openings 24, are also provided intermediately of the openings 24 in the driven member for receiving the outer ends of the supporting studs of the complementary member to prevent binding of said studs thereon against the opposite member.

Assuming the parts to be constructed as described, the coupling is assembled by attaching the flexible links to paired ears on the respective disk members as illustrated in the drawings (Fig. 4), and attaching the disk members to the respective shaft sections by studs 17 and bolts 23 (Fig. 3). With the shaft sections positioned in their respective bearings, the coupling members are assembled by bolting the intervening ears of one coupling member to the central portions of the links of the other coupling member (Fig. 1). When the engine and clutch are erected, their bearings are in substantial alignment so that the coupling may be assembled as described, any slight mis-alignment of the sections being absorbed in the flexible links so that rotation may be transmitted from one shaft section to the other so that even with a slight mis-alignment of the sections, transmission of rotation from one shaft section to the other may be effected without strain on the bearings, and should further mis-alignment occur, due to uneven settling of the foundations or other causes, such additional variation in axial alignment is absorbed by the flexible links and such strain avoided.

The hub of one of the coupling elements forms a bearing for the stud of the other element so that one supports the other and an intermediate support from a foundation is unnecessary, thereby saving space in the assembly, the arcuate bearing races permitting adjustment of the coupling for variation in angularity of the shaft sections without affecting the point of intersection of the axes of the respective sections.

What I claim and desire to secure by Letters Patent is:

1. In a shaft coupling, complementary coupling members connected with respective shaft members, each coupling member having peripheral ears in staggered relation with similar ears on its complementary member, flexible links attached to selected adjacent ears of each coupling member and to intervening ears of the complementary member.

2. In a shaft coupling, complementary coupling members connected with respective shaft sections, each coupling member having peripheral ears in staggered relation with the ears of the other member, flexible links on each member attached to selected adjacent ears thereof, means pivoting one member with the other, each member having intermediate free ears, and means connecting the intermediate ears of one member with the links of the other member.

3. In combination with aligning shaft sections, coupling members on the respective sections having spaced radial ears, the coupling members arranged with the ears of one member staggered in relation to those of the other member, and flexible links attached to adjacent ears of one member and to the intermediate ear of the other member.

In testimony whereof I affix my signature.

SAMUEL B. GOLD.